United States Patent
Wang et al.

(10) Patent No.: US 10,541,903 B2
(45) Date of Patent: Jan. 21, 2020

(54) METHODOLOGY TO IMPROVE THE ANOMALY DETECTION RATE

(71) Applicant: Futurewei Technologies, Inc., Plano, TX (US)

(72) Inventors: Zhibi Wang, Woodridge, IL (US); Tuo Li, Chicago, IL (US)

(73) Assignee: Futurewei Technologies, Inc., Plano, TX (US)

( * ) Notice: Subject to any disclaimer, the term of this patent is extended or adjusted under 35 U.S.C. 154(b) by 186 days.

(21) Appl. No.: 15/274,315

(22) Filed: Sep. 23, 2016

(65) Prior Publication Data

US 2017/0099208 A1    Apr. 6, 2017

Related U.S. Application Data

(60) Provisional application No. 62/236,745, filed on Oct. 2, 2015.

(51) Int. Cl.
*H04L 12/26* (2006.01)
*G06N 20/00* (2019.01)
*H04L 12/24* (2006.01)
*H04L 29/06* (2006.01)

(52) U.S. Cl.
CPC ............. *H04L 43/16* (2013.01); *G06N 20/00* (2019.01); *H04L 41/145* (2013.01); *H04L 43/0876* (2013.01); *H04L 43/50* (2013.01); *H04L 69/16* (2013.01)

(58) Field of Classification Search
CPC ........................................ H04L 43/16

USPC ......................................................... 709/224
See application file for complete search history.

(56) References Cited

U.S. PATENT DOCUMENTS

| 9,231,972 | B2 | 1/2016 | Ou et al. |
| 9,411,957 | B2 | 8/2016 | Jiang et al. |
| 2005/0198519 | A1 | 9/2005 | Tamura et al. |
| 2008/0240128 | A1 | 10/2008 | Elrod |
| 2009/0016226 | A1* | 1/2009 | LaVigne ............. H04L 63/1408 370/241 |

(Continued)

FOREIGN PATENT DOCUMENTS

| CN | 101286897 A | 10/2008 |
| CN | 103384213 A | 11/2013 |

(Continued)

*Primary Examiner* — David R Lazaro
*Assistant Examiner* — Zia Khurshid
(74) *Attorney, Agent, or Firm* — Slater Matsil, LLP

(57) ABSTRACT

A system and method of improving anomaly detection rate in a communication network. A server computer may receive a data set comprising traffic flows communicated over the communication network and group the traffic flows into data categories based on the type of network service such as transport control protocol (TCP) port numbers or User Datagram Protocol (UDP) port numbers of the traffic flows, or based on application layer protocols associated with the traffic flows. The server computer may further detect anomalies in each of the data categories based on inconsistencies between at least one common feature associated with a data category and traffic flows in the data category. Different data categories may be associated with different the at least one common feature. The anomaly detection may be supervised or unsupervised.

20 Claims, 4 Drawing Sheets

(56) References Cited

U.S. PATENT DOCUMENTS

| | | | | |
|---|---|---|---|---|
| 2014/0250221 A1* | 9/2014 | Boggs | ............... | H04L 41/14 |
| | | | | 709/224 |
| 2014/0289397 A1* | 9/2014 | Dewagamage | ..... | H04L 41/0836 |
| | | | | 709/224 |
| 2016/0365897 A1* | 12/2016 | Gross | ............... | H04B 3/54 |

FOREIGN PATENT DOCUMENTS

| CN | 103685268 A | 3/2014 |
|---|---|---|
| CN | 103812840 A | 5/2014 |
| WO | 2009086843 A1 | 7/2009 |
| WO | 2010076832 A1 | 7/2010 |
| WO | 2011077013 A1 | 6/2011 |

\* cited by examiner ial Application No. 62/236,745, filed on Oct. 2, 2015 and entitled "Methodology to Improve the Anomaly Detection Rate," which is hereby incorporated by reference herein as if reproduced in its entirety.

TECHNICAL FIELD

The present invention relates generally to managing the allocation of resources in a network, and in particular embodiments, to techniques and mechanisms for a methodology to improve the anomaly detection rate.

BACKGROUND

In machine leaning, cluster analysis is typically used as an unsupervised algorithm to detect anomalies. The clustering analysis groups data objects based on characteristics that describe the objects and relations among them. The clustering analysis divides a set of objects into groups such that similar objects are grouped together, and different groups contain objects with dissimilar characteristics. Good clustering is generally characterized by high similarity within a group and high differences among different groups.

A dataset may contain objects whose characteristics are significantly different from other objects in the dataset. These data objects having significant differences are known as outliers or anomalies. Outlier identification finds smaller groups of data objects that are considerably different from the rest of the data. Outlier mining identifies patterns in data that do not conform to the rest of the data. Outlier mining is used in fields such as telecommunication, financial fraud detection, rare gene identification and data cleaning.

SUMMARY OF THE INVENTION

Technical advantages are generally achieved, by embodiments of this disclosure which describe a methodology to improve the anomaly detection rate.

In accordance with an embodiment, a method for improving anomaly detection rate in a communication network is provided, as may be performed by a server computer. In this example, the method includes receiving a dataset comprising traffic flows communicated over the communication network, and grouping the traffic flows into data categories based on transport control protocol (TCP) port numbers or User Datagram Protocol (UDP) port numbers of the traffic flows. The method further includes detecting anomalies in each of the data categories based on inconsistencies between at least one common feature associated with a data category and traffic flows in the data category. Different data categories are associated with different the at least one common feature. An apparatus for performing this method is also provided.

In accordance with another embodiment, a method improving anomaly detection rate in a communication network is provided, as may be performed by a server computer. In this example, the method includes receiving a dataset comprising traffic flows communicated over the communication network, and grouping the traffic flows into data categories based on application layer protocols associated with the traffic flows. Each of the data categories includes traffic flows associated with a different application layer protocol. The method further includes detecting anomalies in each of the data categories based on inconsistencies between at least one common feature associated with a data category and traffic flows in the data category. Different data categories are associated with different the at least one common feature. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
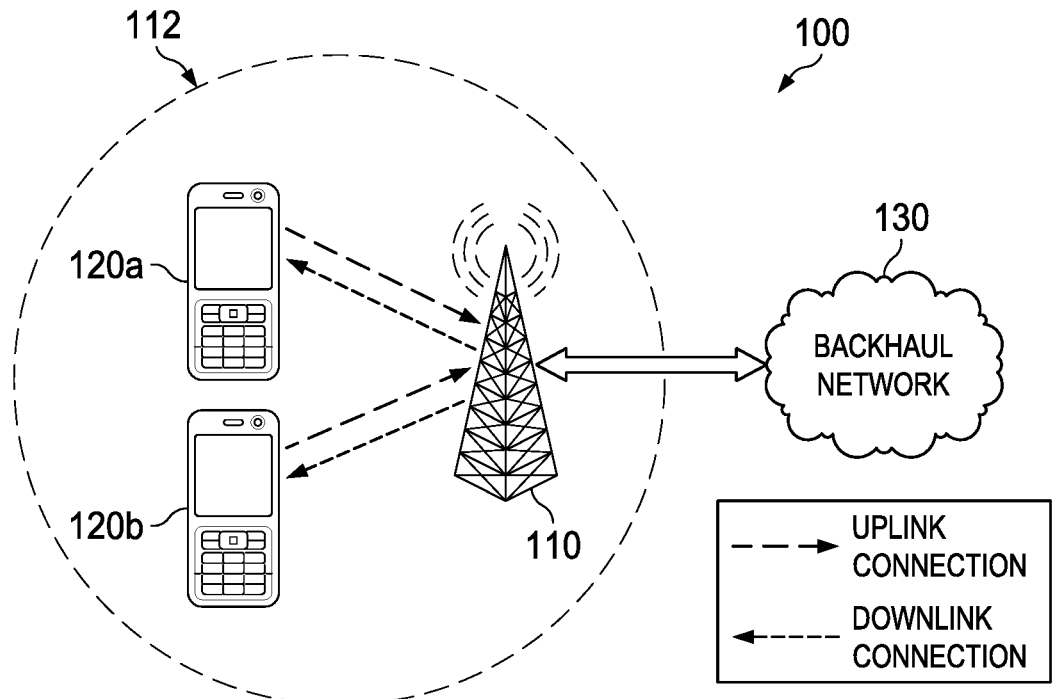
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In the current practice, observation datasets are preprocessed and normalized before the datasets are fed into a machine leaning model as a training set for a baseline, which is used later to detect anomaly on data. There is no categorization of the observation dataset for the machine learning training, which may lead to low anomaly detection rate. For example, a popular dataset researchers use is the KDD CUP 99 dataset that contains about 5 million observations, which contains network flow data from four popular IP protocols where each protocol contains several services. Since each service has significantly different characteristics, using the dataset without differentiating protocols and services may lead to larger fault positive or fault negative prediction rate. Therefore, a mechanism for detecting anomaly in data of different categories is desirable.

Disclosed herein is an embodiment methodology to improve the anomaly detection rate in a communication network. When a server computer receives a dataset comprising traffic flows communicated over the communication network, the server computer may group the traffic flows into data categories based on the type of network service, such as transport control protocol (TCP) port numbers or user datagram protocol (UDP) port numbers, of the traffic flows. The dataset may be internet traffic data stored in a database, and different data categories characterized by TCP or UDP port numbers may correspond to different internet service types. Alternatively, instead of TCP port numbers or UDP port numbers, the server computer may group the traffic flows into data categories based on application layer protocols associated with the traffic flows. Traffic flows from the dataset may be grouped into the data categories in a way of hierarchical categorizing or high dimensional categorizing.

Each of the data categories may include traffic having different TCP port numbers, UDP port numbers, or associated with different application layer protocols. The server computer may detect anomalies in each data category based on inconsistencies between common features associated with a data category and traffic flows in the data category. Different data categories may be associated with different common features such as source IP addresses, destination IP address, traffic volume, traffic frequency, packet size, or features that are derived from TCP/UDP/IP packet headers.

The anomaly detection may be supervised or unsupervised. For example, in unsupervised anomaly detection, a set of common features for a given data category may be identified based on commonalities shared by a majority of traffic flows in the given data category.

On the other hand, in supervised anomaly detection or threat detection, common features associated with a given data category may be based on a corresponding training model. The training model may comprise at least one normal class and at least one abnormal class. Features of traffic flows in the given data category may be compared with a set of features associated with the normal class and with a set of features associated with the abnormal class separately. A traffic flow may be determined abnormal when an inconsistency between features associated with the traffic flow and the set of features associated with the normal class exceeds a first threshold or when an inconsistency between features associated with the traffic flow and the set of features associated with the abnormal class does not exceed a second threshold.

It should be noted that even though a preferred embodiment methodology is applied in the communication field in the present disclosure, the proposed methodology may also be applied in other fields such as financial fraud detection, rare gene identification, and data cleaning.

FIG. 1 illustrates a network 100 for communicating data. The network 100 comprises a base station 110 having a coverage area 112, a plurality of mobile devices 120 (120a, 120b), and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
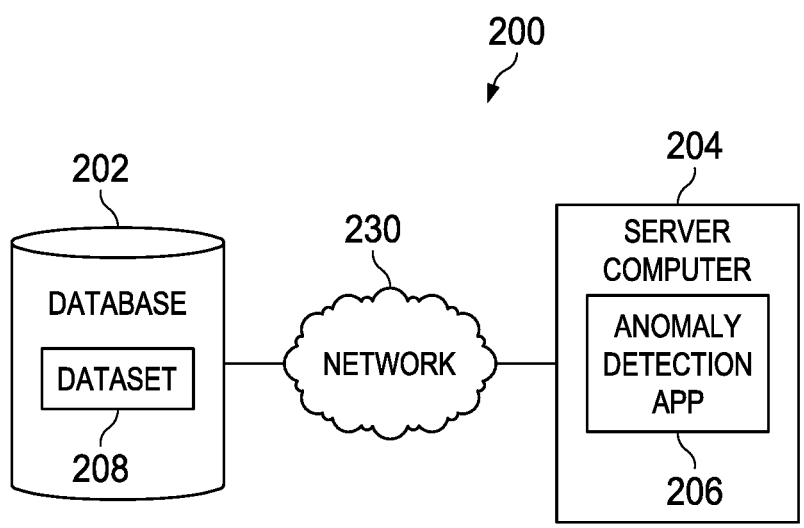
FIG. 2 illustrates a diagram of an embodiment communications network.

FIG. 2 illustrates a communication system 200. As shown, a database 202 and a server computer 204 are communicatively coupled to a network 230. Alternatively, the database 202 and the server computer 204 may be directly communicatively coupled to each other, or the database 202 and the server computer 204 may reside in one server computer. The server computer 204 may comprise an anomaly detection application 206. The database 202 may comprise one or more datasets 208. The server computer 204 or the anomaly detection application 206 may receive a dataset comprising traffic flows communicated over a communication network such as the communication network 100. For example, the server computer 204 may periodically request a dataset from the database 202, or the data base 202 may transmit a dataset to the server computer 204 when a predefined amount of traffic information has been recorded in the dataset. The communication network may be the same as or different than the network 203.

The server computer 204 may group the traffic flows into data categories based on the type of the network service, such as transport control protocol (TCP) port numbers or user datagram protocol (UDP) port numbers of the traffic flows. The dataset may be the dataset 208 of internet traffic data stored in the database 202, and different data categories characterized by TCP or UDP port numbers may correspond to different internet service types.

The internet service type may be one of file transfer protocol (FTP), secure shell (SH), Telnet remote login service, Simple Mail Transfer Protocol (SMTP), Domain Name System (DNS) service, Hypertext Transfer Protocol (HTTP), Post Office Protocol (POPS), Network News Transfer Protocol (NNTP), Network Time Protocol (NTP), Internet Message Access Protocol (IMAP), Simple Network Management Protocol (SNMP), Internet Relay Chat (IRC), or HTTP Secure (HTTPS).

Alternatively, instead of TCP port numbers or UDP port numbers, the server computer 204 may group the traffic flows into data categories based on application layer protocols associated with the traffic flows. Traffic flows from the dataset 208 may be grouped into data categories in a way of hierarchical categorizing or high dimensional categorizing.

Each of the data categories may include traffic having different TCP port numbers, UDP numbers, or associated with different application layer protocols. The server computer 204 or the anomaly detection application 206 may detect anomalies in each data category based on inconsistencies between common features associated with the data category and individual traffic flows in the data category. Different data categories may be associated with different common features such as source IP addresses, destination IP address, traffic volume, traffic frequency, packet size, or features that are derived from TCP/UDP/IP packet headers.

Features of traffic flows in a data category may be compared with features associated with a benign dataset, and a traffic flow may be determined to be abnormal when an inconsistency between features associated with the traffic flow and the features associated with the benign dataset exceeds a threshold. Traffic flows of an individual data category may be further divided into a training set, a validation set, and a test set. A prediction model may be built based on traffic flows in an individual data category, and the prediction model may be applied to future traffic flows of the individual data category for classification.

The anomaly detection application 206 may perform unsupervised anomaly detection, supervised threat prediction, or a combination thereof. For example, in unsupervised anomaly detection, a set of common features for a data category may be identified based on commonalities shared by a majority of traffic flows in the data category. On the other hand, in supervised threat prediction, common features associated with a data category may be based on a training model corresponding to the data category.

For example, for the unsupervised anomaly detection, a set of common features for a data category may be identified based on commonalities shared by a predefined amount of traffic flows in the data category such as 99% of the traffic flows. For instance, 99% of traffic flows in a first data category comprises infrequent, large packets, such as email traffic; 99% of traffic flows in a second data category comprises bursty, small packets, such as audio streaming traffic. It should be noted that a majority of traffic flows may be any ratio of more than half and less than all of the traffic flows.

For the supervised threat detection, different techniques such as clustering or pattern recognition may be utilized by the anomaly detection application 206 for unsupervised anomaly detection. Different pattern recognition procedures, such as data preprocessing, data normalization, feature selection, feature space reduction, parameters selection, or training, validation, and testing of a model associated with the given data category, may be applied to different data categories. The training model associated with the data category may comprise at least one normal class and at least one abnormal class. To predict classification in a data category, features of traffic flows in the data category may be compared by the anomaly detection application 206 with a set of features associated with the normal class and a set of features associated with the abnormal class separately.

For the supervised threat prediction, the algorithm in the anomaly detection application 206 may determine the class labels for unseen instances (e.g., traffic flows) based on a set of features associated with a traffic flow to be determined. The predicted class may be normal or abnormal. A traffic flow may be determined to be abnormal when an inconsistency between features associated with the traffic flow and the set of features associated with normal class(es) exceeds a first threshold. Alternatively or additionally, the traffic flow may be determined to be abnormal when an inconsistency between features associated with the traffic flow and the set of features associated with abnormal class(es) does not exceed a second threshold.

A prediction model may be built based on traffic flows in an individual data category for each of the at least one normal class and the at least one abnormal class, and may be applied to future traffic flows of the individual data category for classification.

Figure 3:
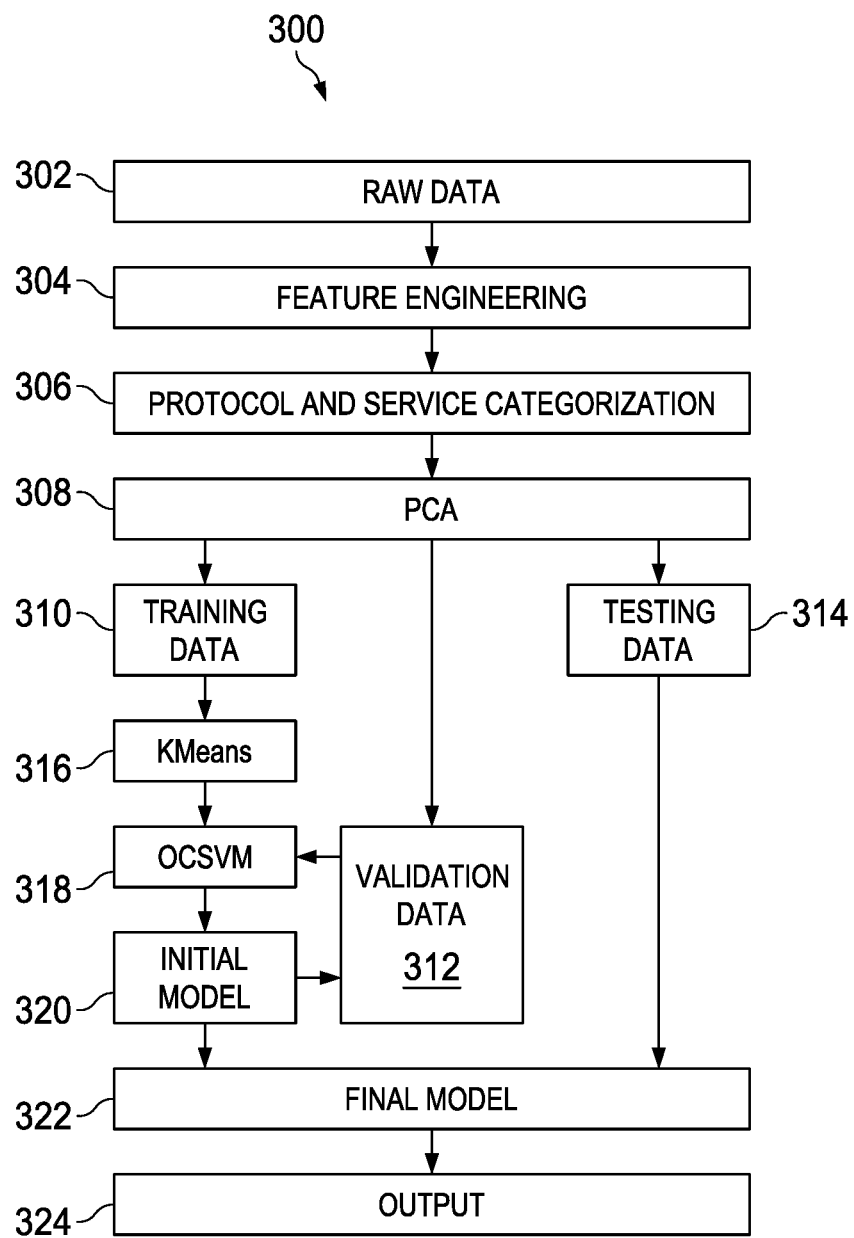
FIG. 3 illustrates a flowchart of an embodiment method for anomaly detection.

FIG. 3 illustrates an embodiment anomaly detection method 300, as may be performed by a server computer. As shown, the method 300 begins at step 302, where raw data on internet traffic is provided. Thereafter, the method 300 proceeds to step 304, where feature engineering is applied to the raw data to generate objects in a dataset. Subsequently, the method 300 proceeds to step 306, where the objects in the dataset are categorized, for example based on protocol and/or service categorization.

In steps 308-324, an independent machine learning procedure is applied to each category of objects in the dataset. In step 308, principal component analysis (PCA) is applied to each category. For example, each category of data may be divided into training data (block 310), validation data (block 312), and testing data (block 314).

In step 316, a machine learning model, selected for the particular data category, may be applied to the training data to cluster the data. For example, a k-means algorithm may be applied to the training data. A same or different machine learning model may be applied to each category. In step 318, an anomaly detection algorithm may be applied to the clustered data of each category. For example, a one-class support vector machine (OCSVM) may be applied to the clustered data to detect anomalies. A same or different anomaly detection algorithm may be applied to each category of data. The anomaly detection algorithm may also be applied to the validation data. In step 320, an initial model is generated from the training data. The initial model may be validated against the validation data. In step 322, a final model is generated, and the testing data may be used to test the final model. In step 324, an output model is generated for each category.

An example algorithm for implementing the method 300 is provided in Table 1.

TABLE 1

Algorithm 1 Categorical Anomaly Detection System (CADS) (trainSet, validSet, and testSet)

```
1:  procedure CADS( trainSet, validSet, and testSet )
2:      A ← trainSet
3:      B ← validSet
4:      C ← testSet
5:      Feature Transformation (FeatureTrans).
6:          ▷ non-numerical features ordered alphabetically.
7:          ▷ numerical features transformed by log(X+1) and then centered.
8:      A ← FeatureTrans(A)
9:      B ← FeatureTrans(B)
10:     C ← FeatureTrans(C)
11:     Categorize Dataset (CateData).
12:         ▷ divide A, B, C into protocol and service combinations (categories) such as (udp + domain_u), (tcp + http),
            (icmp + eco_i) etc.
13:     D = A_{protocol, service} ← CateData(A)
14:     E = B_{protocol, service} ← CateData(B)
15:     F = C_{protocol, service} ← CateData(C)
16:     Modeling
17:     for D(i) in D; E(i) in E; F(i) in F do                    ▷ i represents the categories.
18:         D(i) ← PCA(D(i))                                      ▷ implement PCA to realize dimension reduction.
```

TABLE 1-continued

Algorithm 1 Categorical Anomaly Detection System (CADS) (trainSet, validSet, and testSet)

```
19:          K ← 1
20:          s_max ← 0
21:          while K < length(D(i)) do
22:                  D_1(i), D_2(i), ...D_K (i) ← kMeans(D(i), K)        ▷ perform K-means clustering based on the principle
     components.
23:                  if Max{s(kMeans(D(i), K)]} > s_max then             ▷ choose best K number by Silhouette value.
24:                          s_max ← Max{s[kMeans(D(i), K)]}
25:                          K ← K++
26:                  else
27:                          break
28:                  end if
29:          end while
30:          for k in 1, 2, 3 ... K do
31:                  for γ_k in 2^n, n ∈ {-10, -9, ... 0} do
32:                          Model{D_k(i)} ← OCSVM(D_k(i), γ_k(i))        ▷ initial One-Class SVM on D_k(i).
33:                          Model{D_k(i)} ← Model{D_k(i)}.predict{E(i)}
34:                          n ← n++                                     ▷ update the One-Class SVM using E(i).
35:                  end for
36:                  Model{D(i)} ← Max(Model{D_k(i)})                    ▷ finalize the One-Class SVM.
37:          end for
38:          Model{D(i)}.predict{F(i)}                                   ▷ test the testing data.
39:      end for
40:      return Accuracy, Recall and F P R.
41: end procedure
```

In lines 5-10, feature engineering (e.g., step 304) is applied to raw data. In lines 11-15, the data objects in the dataset are categorized (e.g., step 306). In lines 16-14, an independent machine learning procedure is applied to each category i in the dataset (e.g., steps 308-324 of FIG. 3). For example, in line 18, PCA is applied in order to realize dimension reduction. In line 22, machine learning modeling, such as k-means algorithm, is applied (e.g., step 316). In line 23, the best k number is selected by silhouette value. In lines 32-36, an anomaly detection method such as OCSMV is applied (e.g., step 318). In line 38, the model is tested using testing data (e.g., step 322) in order to generate an output model.

When embodiments were applied to the KDD CUP 99 dataset, improvements in anomaly detection were observed. Table 2 provides testing results that were obtained by applying embodiment anomaly detection techniques to the KDD CUP 99 dataset.

TABLE 2

| Recall = AA/(NA + AA) | | Actual Class | |
|---|---|---|---|
| FPR = AN/(AN + NN) | | Normal (N) | Anomaly (A) |
| Predicted Class | Normal (N) | 48479 | 358 |
| | Anomaly (A) | 4020 | 14347 |

| Results obtained using KDD 99 Data | | |
|---|---|---|
| Methods | Recall | FPR |
| KNN | 93% | 10% |
| SVM | 91% | 8.0% |
| SOM | 98% | 10% |
| OC | 89% | 7.6% |
| OUR | 98% | 7.6% |

Figure 4:
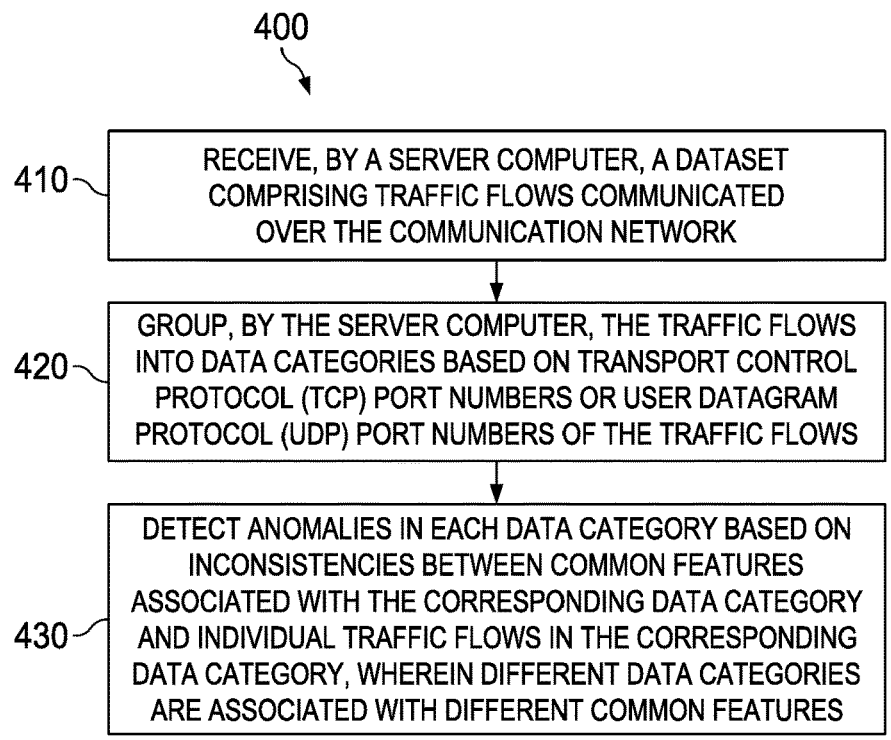
FIG. 4 illustrates a flowchart of an embodiment method for improving anomaly detection rate in a communication network.

FIG. 4 illustrates an embodiment method 400 for improving anomaly detection rate in a communication network, as may be performed by a server computer. As shown, the method 400 begins at step 410, where a dataset comprising traffic flows communicated over the communication network is received by a server computer. Thereafter, the method 400 proceeds to step 420, where the traffic flows are grouped by the server computer into data categories based on transport control protocol (TCP) port numbers or User Datagram Protocol (UDP) port numbers of the traffic flows.

Subsequently, the method 400 proceeds to step 430, where anomalies are detected in each data category based on inconsistencies between common features associated with the corresponding data category and individual traffic flows in the corresponding data category. Different data categories may be associated with different common features.

Figure 5:
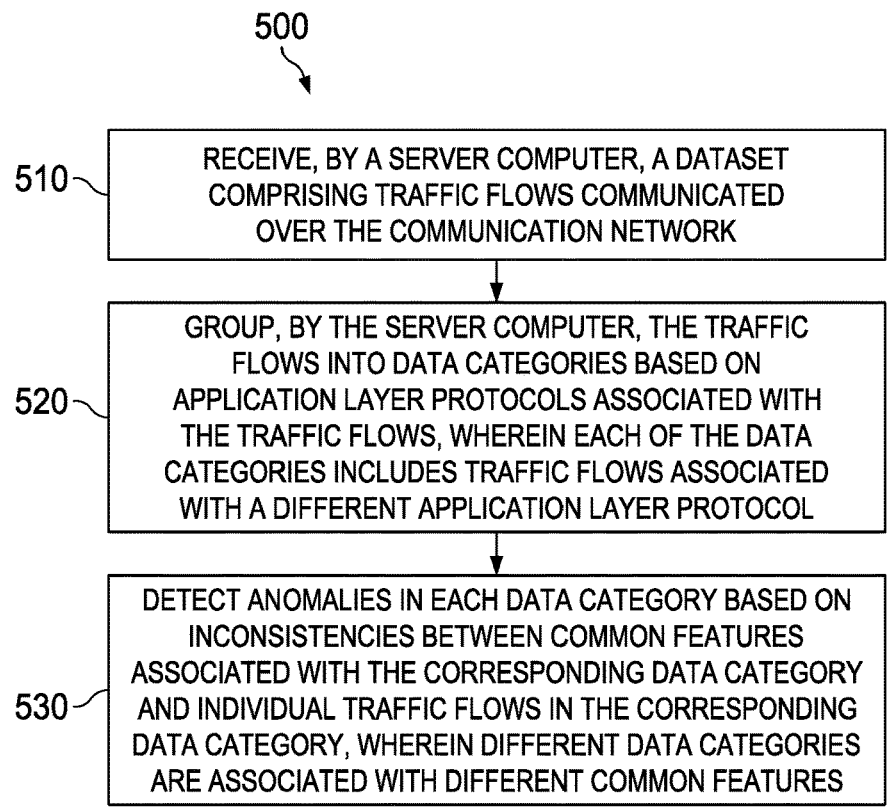
FIG. 5 illustrates a flowchart of another embodiment method for improving anomaly detection rate in a communication network.

FIG. 5 illustrates another embodiment method 500 for improving anomaly detection rate in a communication network, as may be performed by a server computer. As shown, the method 500 begins at step 510, where a dataset comprising traffic flows communicated over the communication network is received by a server computer.

Thereafter, the method 500 proceeds to step 520, where the traffic flows are grouped by the server computer into data categories based on application layer protocols associated with the traffic flows. Each of the data categories may include traffic flows associated with a different application layer protocol. Subsequently, the method 500 proceeds to step 530, where anomalies are detected in each data category based on inconsistencies between common features associated with the corresponding data category and individual traffic flows in the corresponding data category. Different data categories may be associated with different common features.

Figure 6:
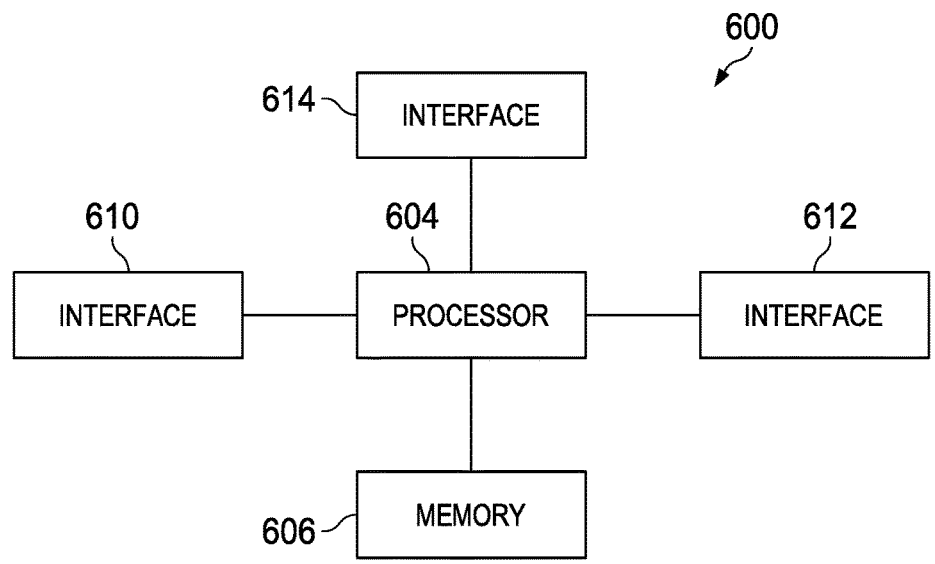
FIG. 6 illustrates a diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/ components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
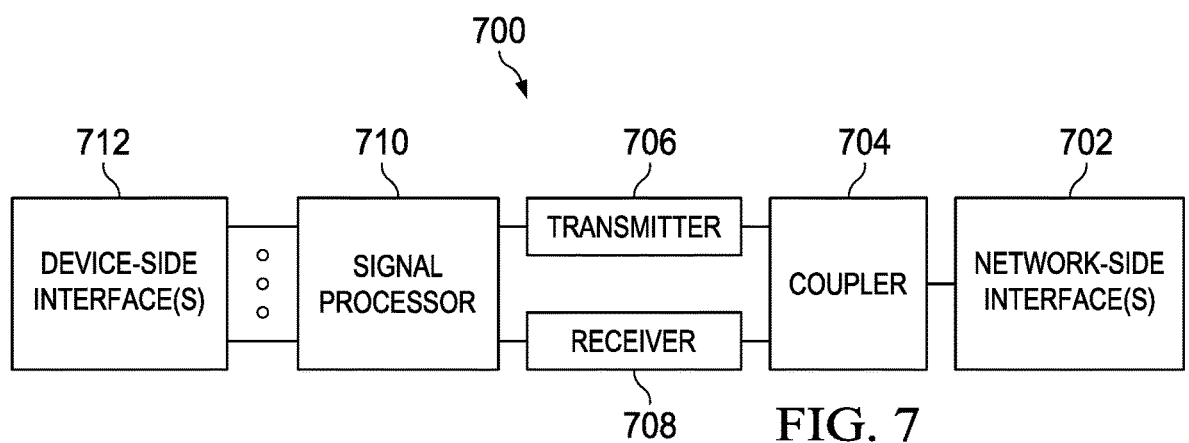
FIG. 7 illustrates a diagram of an embodiment transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a listening unit/module, a determining unit/module, a refraining unit/module, and/or a performing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for improving anomaly detection rate in a communication network, the method comprising:

receiving, by a server computer, a dataset comprising traffic flows communicated over the communication network;

grouping, by the server computer, the traffic flows into different data categories according to transport control protocol (TCP) port numbers or User Datagram Protocol (UDP) port numbers of the traffic flows, such that traffic flows that are grouped into a same data category have a same TCP port number or UDP port number, wherein each of the different data categories is associated with a set of common features that have been predetermined for traffic in an associated data category, and different data categories are associated with different sets of common features;

detecting anomaly of the traffic flows communicated over the communication network by detecting anomaly of traffic flows that have been grouped into each data category using the set of common features associated with a corresponding category, wherein detecting the anomaly of the traffic flows communicated over the communication network comprises:

identifying a first traffic flow in a first data category that has features that are inconsistent with the set of common features associated with the first data category; and detecting whether the first traffic flow in the first data category has anomaly based on inconsistency of the features of the first traffic flow with the set of common features associated with the first data category; and building a prediction model using the first data category and the first traffic flow for detecting anomalies in other traffic flows that are categorized in the first data category.

2. The method of claim 1, further comprising:

identifying at least one common feature for a data category based on commonalities shared by a predefined amount of traffic flows in the data category.

3. The method of claim 1, wherein detecting the anomaly of the traffic flows communicated over the communication network further comprises:

comparing features of traffic flows in a data category with features associated with a benign dataset; and determining that a traffic flow is an outlier when an inconsistency between features associated with the traffic flow and the features associated with the benign dataset exceeds a threshold.

4. The method of claim 1, wherein at least one common feature associated with a data category is based on a training model corresponding to the data category.

5. The method of claim 4, wherein the at least one common feature is identified using classification prediction of traffic flows by applying a pattern recognition procedure corresponding to the data category, and wherein the training model corresponding to the data category comprises at least one normal class and at least one abnormal class.

6. The method of claim 5, wherein the pattern recognition procedure is at least one of data preprocessing, data normalization, feature selection, feature space reduction, or parameters selection.

7. The method of claim 5, wherein the pattern recognition procedure is training, validation, and testing of a model associated with the data category.

8. The method of claim 5, wherein the classification prediction comprises:

comparing features of traffic flows in the data category with features associated with the at least one normal class;

comparing features of the traffic flows in the data category with features associated with the at least one abnormal class; and determining that a traffic flow is abnormal when an inconsistency between features associated with the traffic flow and the features associated with the at least one normal class exceeds a first threshold or when an inconsistency between features associated with the traffic flow and the features associated with the at least one abnormal class does not exceed a second threshold.

9. The method of claim 1, wherein the dataset is internet traffic data stored in a database, and wherein different categories characterized by TCP or UDP port numbers correspond to different internet service types.

10. A method for improving anomaly detection rate in a communication network, the method comprising:

receiving, by a server computer, a dataset comprising traffic flows communicated over the communication network;

grouping, by the server computer, the traffic flows into different data categories according to application layer protocols associated with the traffic flows, such that traffic flows that are grouped into a same data category are associated with a same application layer protocol, wherein each of the different data categories is associated with a set of common features that have been predetermined for traffic in an associated data category, and different data categories are associated with different sets of common features;

detecting anomaly of the traffic flows communicated over the communication network by detecting anomaly of traffic flows that have been grouped into each data category using the set of common features associated with a corresponding category, wherein detecting the anomaly of the traffic flows communicated over the communication network comprises:

identifying a first traffic flow in a first data category that has features that are inconsistent with the set of common features associated with the first data category; and detecting whether the first traffic flow in the first data category has anomaly based on inconsistency of the features of the first traffic flow with the set of common features associated with the first data category; and building a prediction model using the first data category and the first traffic flow for detecting anomalies in other traffic flows categorized in the first data category.

11. The method of claim 10, further comprising:

identifying at least one common feature for a data category based on commonalities shared by a predefined amount of traffic flows in the data category.

12. The method of claim 10, wherein detecting the anomaly of the traffic flows communicated over the communication network further comprises:

comparing features of traffic flows in a data category with features associated with a benign dataset; and determining that a traffic flow is an outlier when an inconsistency between features associated with the traffic flow and the features associated with the benign dataset exceeds a threshold.

13. The method of claim 10, wherein at least one common feature associated with a data category is based on a training model corresponding to the data category.

14. The method of claim 13, wherein the at least one the common feature is identified using classification prediction of traffic flows by applying a pattern recognition procedure corresponding to the data category, and wherein the training model corresponding to the data category comprises at least one normal class and at least one abnormal class.

15. The method of claim 14, wherein the pattern recognition procedure is at least one of data preprocessing, data normalization, feature selection, feature space reduction, or parameters selection.

16. The method of claim 14, wherein the pattern recognition procedure is training, validation, and testing of a model associated with the data category.

17. The method of claim 14, wherein the classification prediction comprises:

comparing features of traffic flows in the data category with features associated with the at least one normal class;

comparing features of the traffic flows in the data category with features associated with the at least one abnormal class; and determining that a traffic flow is abnormal when an inconsistency between features associated with the traffic flow and the features associated with the at least one normal class exceeds a first threshold or when an inconsistency between features associated with the traffic flow and the features associated with the at least one abnormal class does not exceed a second threshold.

18. The method of claim 10, wherein the dataset is internet traffic data stored in a database.

19. A server computer configured to improve anomaly detection rate in a communication network, the server computer comprising:

a non-transitory memory storage comprising instructions; and one or more processors in communication with the memory storage, wherein the one or more processors execute the instructions to:

receive a dataset comprising traffic flows communicated over the communication network;

group the traffic flows into different data categories according to transport control protocol (TCP) port numbers or User Datagram Protocol (UDP) port numbers of the traffic flows, such that traffic flows that are grouped into a same data category have a same TCP port number or UDP port number, wherein each of the different data categories is associated with a set of common features that have been predetermined for traffic in an associated data category, and different data categories are associated with different sets of common features;

detect anomaly of the traffic flows communicated over the communication network by detecting anomaly of traffic flows that have been grouped into each data category using the set of common features associated with a corresponding category, wherein detecting the anomaly of the traffic flows communicated over the communication network comprises:

identifying a first traffic flow in a first data category that has features that are inconsistent with the set of common features associated with the first data category; and detecting whether the first traffic flow in the first data category has anomaly based on inconsistency of the features of the first traffic flow with the set of common features associated with the first data category; and build a prediction model using the first data category and the first traffic flow for detecting anomalies in other traffic flows categorized in the first data category.

20. A server computer configured to improve anomaly detection rate in a communication network, the server computer comprising:

a non-transitory memory storage comprising instructions; and one or more processors in communication with the memory storage, wherein the one or more processors execute the instructions to:

receive a dataset comprising traffic flows communicated over the communication network;

group the traffic flows into different data categories according to application layer protocols associated with the traffic flows, such that traffic flows that are grouped into a same data category are associated with a same application layer protocol, wherein each of the different data categories is associated with a set of common features that have been predetermined for traffic in an associated data category, and different data categories are associated with different sets of common features;

detect anomaly of the traffic flows communicated over the communication network by detecting anomaly of traffic flows that have been grouped into each data category using the set of common features associated with a corresponding category, wherein detecting the anomaly of the traffic flows communicated over the communication network comprises:

identifying a first traffic flow in a first data category that has features that are inconsistent with the set of common features associated with the first data category; and detecting whether the first traffic flow in the first data category has anomaly based on inconsistency of the features of the first traffic flow with the set of common features associated with the first data category; and build a prediction model using the first data category and the first traffic flow for detecting anomalies in other traffic flows categorized in the first data category.

* * * * *